UNITED STATES PATENT OFFICE.

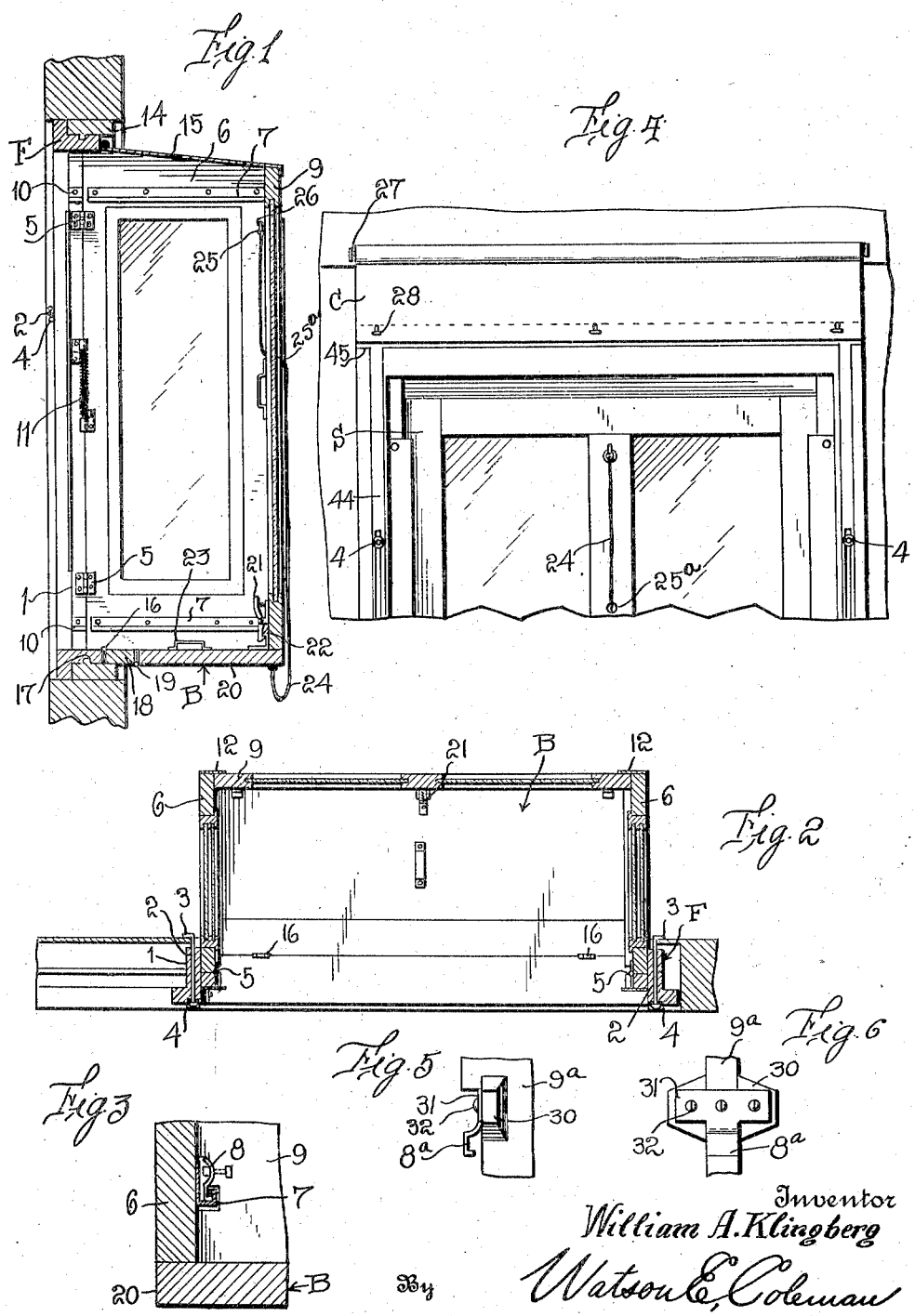

WILLIAM A. KLINGBERG, OF AFTON, OKLAHOMA.

WINDOW-SHIELD.

1,290,239.     Specification of Letters Patent.     Patented Jan. 7, 1919.

Application filed April 29, 1918. Serial No. 231,412.

*To all whom it may concern:*

Be it known that I, WILLIAM A. KLINGBERG, a citizen of the United States, residing at Afton, in the county of Ottawa and State of Oklahoma, have invented certain new and useful Improvements in Window-Shields, of which the following is a specification, reference being had to the accompanying drawings.

This invention is an improvement of my Patent No. 1246936 dated November 20, 1917, and my pending application, Serial No. 199041, filed October 29, 1917 and it is an object of the present invention to provide novel and improved means whereby the device may be conveniently folded in a manner to permit the same to have sliding movement in the window frame of a locomotive cab so that when the device is not in use it may be readily moved in a position out of the way and to have the cab window completely open.

It is also an object of the invention to provide a novel and improved shield of this general character including a frame slidably engaged with the window opening of a locomotive cab or the like and which frame has engaged therewith a plurality of panels associated in a manner to effectively protect the engine man from the elements and from flying particles when the panels are extended and whereby the panels when collapsed are contained within the frame so that said panels, when collapsed, will offer no obstruction to the sliding movement of the frame when it is desired to move the device into an inoperative position.

The invention consists in the details of construction and in the combination and arrangement of the several parts of my improved window shield whereby certain important advantages are attained and the device rendered simpler, less expensive and otherwise more convenient and advantageous for use, as will be hereinafter more fully set forth.

Figure 1 is a vertical section view taken through a window shield constructed in accordance with an embodiment of my invention in extended adjustment, the coacting portion of a cab being also indicated by section;

Fig. 2 is a longitudinal sectional view taken through the device as illustrated in Fig. 1;

Fig. 3 is a fragmentary sectional view illustrating one of the sliding connections between a side panel and the front panel;

Fig. 4 is a fragmentary view in elevation illustrating a shield constructed in accordance with a modified form of my invention;

Fig. 5 is a fragmentary view in front elevation illustrating a means for securing a shoe to the front panel; and Fig. 6 is a fragmentary view in end elevation illustrating the structure disclosed in Fig. 5.

As disclosed in the accompanying drawings F denotes the frame of my improved shield positioned within the window opening of a locomotive cab or the like and which is adapted to have longitudinal sliding movement in the same manner as the window as now generally employed in locomotive cabs so that when desired the frame and the parts carried thereby may be moved away from the window opening and occupy a position in which the frame and its parts offer no obstruction or interference.

Disposed through the vertical stiles 1 of the frame F are the elongated shanks 2 having their outer end portions angularly disposed as at 3 to overlie the outer faces of the vertical marginal portions of the window opening, while the inner end portions of said shanks 2 have in threaded engagement therewith the winged nuts 4 whereby the shanks 2 may be caused to hold the frame F in applied position when my improved shield is in use.

Hingedly connected as at 5 with the vertical stiles 1 of the frame F are the end panels 6. Each of said panels 6 adjacent the upper and lower ends thereof is provided with the transversely disposed trackways 7 with which are slidably engaged the shoes 8 carried by the adjacent vertical marginal portion of the front panel 9. In horizontal alinement with the trackways 7 the vertical stiles 1 of the frame F are provided with the trackways 10 which receive the shoes 8 of the front panel 9 when said front panel is moved inwardly within the frame F and when it is desired to collapse the shield.

Coacting with each of the vertical stiles 1 of the frame F and the adjacent end panels 6 is the spring hinge 11 which serves to automatically swing the end panel 6 inwardly within the frame F. When the end panels 6 are in their folded position they overlie the front panel 9 and are also received within the frame F.

The outer or free vertical marginal portions of the end panels 6 are provided with the inwardly directed flanges 12 which serve to limit the outward movement of the front panel 9 when the shield is extended. It will be self-evident that as the front panel 9 is forced outwardly the end panels 6 will also be thrown outwardly and that said panels 6 will be maintained in open or extended position through the medium of the panel 9. Hingedly connected with the upper rail 14 of the frame F is the top panel 15 which rests upon the upper edges of the end panels 6 and the front panel 9 when the shield is extended. When the shield is collapsed the top panel 15 drops downwardly by gravity.

Hingedly connected as at 16 with the forward marginal portion of the lower longitudinal rail 17 of the frame F is a short section 18 of the bottom panel B. The section 18 is arranged for upward swinging movement. Hingedly connected as at 19 with the forward or outer marginal portion of the section 18 is the main section 20 of the bottom panel B which is of a width to underlie the front panel 9 when said front panel is at the limit of its outward movement and the lower portion of the front panel 9 is provided with the latch 21 engaging a keeper 22 carried by the outer portion of the section 20 of the bottom panel B for holding the same in applied or operative position when the shield is extended for use. When the latch 21 is released from the keeper 22 the section 20 of the bottom panel B will drop by gravity so that no obstruction will be offered to the inward movement of the front panel 9 and the end panels 6. After the panels 6 and 9 have been swung within the frame F the panel B is swung upwardly to substantially a vertical position so that the frame F and the panels carried thereby may be readily moved into an inoperative position or away from the window opening. The inner face of the section 20 of the bottom panel B is provided with the hand grasp 23 for convenience of the engine man when the occasions of practice may require. It is also to be noted that the adjacent longitudinal margins of the sections 18 and 20 of the bottom panel B abut when upward movement is imparted to the section 20 so that both of the sections 18 and 20 will be swung into a substantially vertical position when the shield is collapsed.

In order that the bottom panel B may be swung upwardly I secure to the outer longitudinal marginal portion thereof a flexible member 24 which extends upwardly through an opening 25$^a$ suitably positioned upon the front panel 9 so that the engine man may impose the desired pull upon the member 24 to elevate the bottom panel B after the panels 6 and 9 have been swung inwardly into folded or collapsed position. The inner extremity of the member 24 may be secured to a ring 25 or the like to be engaged with the inwardly directed hook carried by the front panel 9 when the shield is extended. The flexible member 24 may be also suitably engaged with the hook 26 when the shield is folded or collapsed. If desired other means may be employed for positively holding the front panel elevated, but this in itself is not deemed an important feature of my invention.

The form of invention as particularly illustrated in Figs. 1 and 2 is a type which is constructed to snugly fit within the cab window and forms a permanent part of the cab structure. In the event however the shield may be supplied by the individual operator, I find it of advantage to employ the arrangement particularly illustrated in Fig. 4. In this form of my invention the shield is denoted in its entirety by the letter S and is of a construction substantially identical to what has been hereinbefore disclosed relative to Figs. 1 and 2. However, coacting with the vertical stiles of the frame of the shield S are the arms 44 and cross piece 45 particularly described and claimed in my copending application Serial No. 199041 filed October 29, 1917 and which arms 44 and cross piece 45 coact with the upper marginal portion of the cab window or the like for maintaining the frame in applied position. In the event that the window opening should be of a height in excess of the height of the frame of the shield S the cross piece 45 is elevated to contact with the upper marginal portion of the window opening and if desired a filler board may be interposed between said cross piece 45 and the top of the frame as particularly set forth in my copending application hereinbefore referred to. However in lieu of a board I can employ the flexible curtain C having its upper end portion wound around a spring roller 27 of a conventional type and having its lower marginal portion detachably engaged as indicated at 28 with the cross piece 45. The curtain C and roller 27 are arranged within the cab.

As disclosed in Figs. 5 and 6 the opposite faces of the front panel 9$^a$ has secured thereto the blocks 30 having their outer faces flush with the adjacent edge of the front panel 9$^a$. The shoe 8$^a$ includes the plate 31 which bridges the end edge of the panel 9$^a$ and overlies the adjacent faces of the blocks 30 and said plate 31 is secured thereto by the screws 32 or other fastening members. By this arrangement it will be perceived that the shoe 8$^a$ is effectively held in assembled relation and against possible swinging movement.

From the foregoing description, it is thought to be obvious that a window shield constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A shield of the character described consisting of a frame, end panels hingedly connected with the frame and provided with trackways extending transversely thereof, a front panel having slidable engagement with the trackways of the end panels and movable within the frame, a top panel hingedly connected with the frame for closing the upper end of the shield, and a bottom panel hingedly connected with the frame and adapted to close the lower end of the shield.

2. A shield of the character described consisting of a frame, end panels hingedly connected with the frame and provided with trackways extending transversely thereof, a front panel having slidable engagement with the trackways of the end panels and movable within the frame, a top panel hingedly connected with the frame for closing the upper end of the shield, a bottom panel hingedly connected with the frame and adapted to close the lower end of the shield, and means for swinging the end panels inwardly when the front panel is within the frame.

3. A shield of the character described consisting of a frame, end panels hingedly connected with the frame and provided with trackways extending transversely thereof, a front panel having slidable engagement with the trackways of the end panels and movable within the frame, a top panel hingedly connected with the frame for closing the upper end of the shield, a bottom panel hingedly connected with the frame and adapted to close the lower end of the shield, and means for raising the bottom panel when the front panel is within the frame.

4. A shield of the character described consisting of a frame, end panels hingedly connected with the frame and provided with trackways extending transversely thereof, a front panel having slidable engagement with the trackways of the end panels and movable within the frame, a top panel hingedly connected with the frame for closing the upper end of the shield, and a bottom panel hingedly connected with the frame and adapted to close the lower end of the shield, said frame being provided with trackways with which the front panel is engaged when the front panel is within the frame.

5. A shield of the character described consisting of a frame, end panels hingedly connected with the frame and provided with trackways extending transversely thereof, a front panel having slidable engagement with the trackways of the end panels and movable within the frame, a top panel hingedly connected with the frame for closing the upper end of the shield, and a bottom panel hingedly connected with the frame and adapted to close the lower end of the shield, said bottom panel consisting of two hingedly connected sections, the outer section of the bottom panel having downward swinging movement independently of the inner section of the bottom panel.

In testimony whereof I hereunto affix my signature in the presence of two witnesses.

WILLIAM A. KLINGBERG.

Witnesses:
 GEO. M. REEVES,
 W. P. SMALLEY.

Copies of this patent may be obtained for five cents each, by addressing the "Commissioner of Patents, Washington, D. C."